United States Patent Office 3,562,015
Patented Feb. 9, 1971

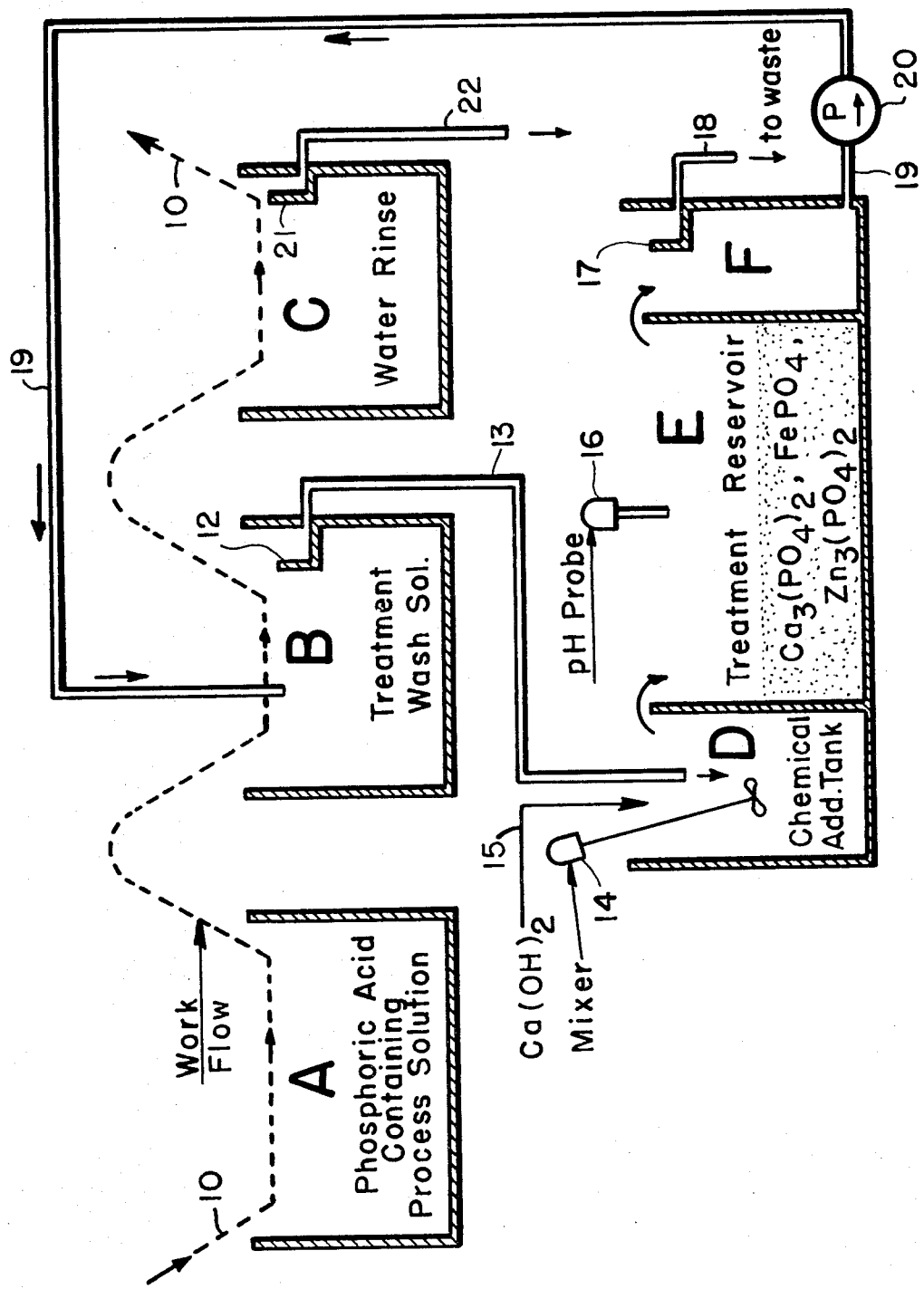

3,562,015
TREATMENT OF PHOSPHATE TYPE CARRY-OVER ON METAL WORKPIECES
Leslie E. Lancy, Ellwood City, Pa., assignor to Lancy Laboratories, Inc., Zelienople, Butler County, Pa. a corporation of Pennsylvania
Filed July 5, 1968, Ser. No. 742,693
Int. Cl. B01d 21/00; C02b 1/30; C02c 5/00
U.S. Cl. 134—13                                 9 Claims

ABSTRACT OF THE DISCLOSURE

A method for removing and neutralizing phosphate type waste or carry-over on workpieces from a metal finishing bath. The carry-over usually consists of large concentrations of iron or zinc phosphates or both and some free phosphoric acid which has been used for phosphatizing, pickling, or metal surface preparation. An aqueous chemical treatment wash solution is used having a pH of less than about 8 and is applied to surfaces of the workpieces during their movement; the solution as thus contaminated is circulated in a system having a treatment solution reservoir or tank, and is subjected to the introduction of hydrated lime, slaked lime, or powdered limestone, either immediately before its introduction into the reservoir or at the time of its introduction, in an amount determined to be sufficient to precipitate and settle-out iron and zinc as well as calcium phosphates in the reservoir. Thereafter, the reconditioned solution is moved from the treatment reservoir back to a workpiece treating tank to provide a continuous washing-off of the surfaces of the metal workpieces. Care is taken to assure that the solution as returned to the treating tank is, for all practical purposes, free of dissolved calcium compounds. An alternative is to employ a caustic soda addition to the solution for precipitating the metal phosphates and to employ a small quantity of calcium ion added as a secondary treatment to the solution for the purpose of removing the minor constituent of the carry-over, namely, free phosphoric acid.

---

The invention relates to a continuous in-line procedure for treating a phosphate type of carry-over, drag-out or waste on the surfaces of metal workpieces that have been previously subjected to a phosphatizing treatment and particularly, for removing and settling-out phosphate waste carry-over on the surfaces of zinc or ferrous metal surfaced workpieces. The invention is concerned particularly with making it practical to utilize lime in a neutralizing or phosphate waste removing operation without forming appreciable precipitates or lime deposits in a treating bath or tank and, at the same time, in such a manner as to meet waste treatment limits for phosphate compounds that are to be discharged into sewers or natural bodies of water.

Waste treatment limits for phosphate compounds in the effluent or an aqueous discharge have been continually tightened by authorities in view of the fertilizer effect of phosphates that enhances algae growth in natural waters into which some of the rinse water effluents may be discharged. The in-line treatment of metal surfaces of workpieces moving out of a phosphate type of treating solution has heretofore been unsuccessful based on the use of lime compounds, since difficulty has been encountered from the standpoint of precipitated calcium salts and compounds in the rinse that tend to adhere to work surfaces, tanks, control cathodes, etc. Such adherent calcium containing deposits cannot be easily removed by water rinsing.

In accordance with the invention, it is now possible to make use of calcium compounds without such difficulties and, at the same time, to provide a continuous-in-line treatment of workpieces as they are moved from a phosphatizing treatment bath.

In the drawing, the figure is a somewhat diagrammatic view of an exemplary integrated in-line treatment layout or system arranged for employment in accordance with principles of the invention for removing and conditioning a phosphate containing waste carry-over on metal workpieces.

In meeting the factors of lime precipitation on working surfaces including tanks, pH determining cathodes, etc., a chemical treatment washing solution is provided and used in such a manner that phosphoric acid and metal phosphates contained in the waste carry-over on workpieces are washed therefrom in a continuous manner during their movement through and out of a treatment bath, and in such a manner that an immediate subsequent water rinse may be accomplished without danger of introducing a significant quantity of phosphates into natural bodies of water by reason of a discharge of the rinse water thereto. The treating solution is primarily first employed as a carrier and pH increasing or partial neutralizer for the phosphates and is continuously moved from a workpiece treating tank or bath B into and through a treatment reservoir E within which chemical reactions mainly occur and phosphate precipitates are settled and from which the solution, as reconditioned by the removal of the phosphates, may be circulated back into the treating bath B for again serving as a take-up or carrier for phosphate waste or carry-over on the workpieces. In employing the invention, care is taken to provide the reconditioned solution with a pH of less than 8 for return to the treating bath or tank B.

In accordance with the first method of the invention, a chemical treatment wash solution is prepared which for all practical purposes is free of dissolved calcium compounds. It is used in such a manner as to avoid the occurrence of an appreciable precipitating reaction with chemicals or the phosphate content of the carry-over within the treating bath or tank B into and through which workpieces 10 are passed after having been subjected to a phosphate type of treatment in bath or tank A. The drag-out or carry-over from tank or bath A typically has an acid pH of about 2.5 to 4. The chemical treatment wash solution is circulated so that its phosphate content is carried from the treating bath B to treatment reservoir or tank E. Calcium in the form of hydrated lime, slaked lime, or powdered limestone may be added immediately before the solution moves into the treatment reservoir or tank E. See chemical addition and mixing tank or station D of the drawings, in FIG. 1, calcium hydroxide is shown being introduced by arrow 15 into chemical addition tank D, along with the introduction of phosphate-carrying treatment solution from a pipe 13. The pipe 13 leads from an overflow 12 of the treating tank or bath B.

For best results, a motor driven mixer unit 14 is shown provided at station or tank D for thoroughly mixing the additions, such as those of a calcium salt or compound or of an alkali hydroxide and a calcium salt or compound, with the entering treatment solution. The addition of an alkali hydroxide is only pertinent to an alternate method later described herein. The entering solution, by reason of the fact that it has had a neutralizing action on the acid pH of the carry-over on the workpieces 10 in tank or bath B, has in its flow from the tank B through the pipe 13, a much lowered pH that is below 8 or near the neutral side. Full reaction with the carry-over and a full precipitation of its phosphate content is assured by the addition of a calcium compound in an amount sufficient to bring the pH up to a range of 6 to 10. This addition can be effected either in a separate addition and mixing tank D or in reservoir or tank E while the effluent is being introduced therein. A pH probe 16 may be used in bath or tank E to assure providing the solution therein with a pH falling within the 6 to 10 range. This, in turn, causes a reaction and precipitation of calcium, iron and zinc phosphates.

The solution leaves tank or reservoir E and enters a discharge tank F and is there provided with a pH of less than 8. The solution of tank F may be tested from time to time to assure that it is substantially free from any dissolved calcium compounds as it is taken off by pipeline 19 and pumped therethrough by pump 20 for returning it to the tank or bath B. Excess solution may be taken off from the tank F by overflow 17 and waste pipe 18. In accordance with the process, the occurrence of a full reaction in the tank or bath B, itself, is avoided. Carry-over from bath B on the continuously in-line moving workpiece line 10 is such that, with water dilution in a subsequent water rinse zone or bath C, phosphates are minimal and the rinse water is innocuous and may, if desired, be discharged into a natural body of water.

The alternate method of employing the invention to provide an in-line continuous treatment is to make use of caustic soda or other suitable alkali metal hydroxide or sodium carbonate or other suitable alkali metal carbonate additions in the aqueous chemical treatment solution and to add lime or a calcium compound ahead of or at the treatment reservoir tank E to convert phosphoric acid into calcium phosphate for precipitation out of the solution. In this connection, a very slight excess of unreacted calcium may be added to the treatment solution, see arrow 15, in the form of calcium hydroxide, calcium carbonate, or soluble salts, such as calcium chloride or calcium nitrate. The calcium compound in a slight unreacted excess in the solution is employed to react with and thus remove the relatively small amount of free phosphoric acid in the carry-over from bath or tank A. The phosphate concentration can thus be kept at a sufficiently low level that drag-out from the tank or bath B carried by the workpieces and washed with free flowing rinse water in tank or zone C will be at a sufficiently low level such that it will not be detectable. By way of example, it has been determined that a phosphate concentration remaining in the treatment wash solution in relation to the calcium ion concentration, as measured with a calcium ion electrode at a pH of 8 as maintained by a caustic soda addition, is as follows:

| $Ca^{++}$ electrode | pH 8.0, NaOH, p.p.m. |
| --- | --- |
| −10 mv | $PO_4$ equals 175.. $Ca^{++}$, 18.4. |
| 0 | $PO_4$ equals 62.. $Ca^{++}$, 40. |
| +10 | $PO_4$ equals 12.. $Ca^{++}$, 130. |

The above last-mentioned or two stage form of treatment has been found to be particularly advantageous after a typical phosphatizing process in which the major constituents of the carry-over on the metal workpieces are metal phosphates, such as those of zinc or iron or both and a minor amount of free phosphoric acid. The metal phosphates will precipitate in view of the high pH that is maintained by the caustic soda addition without requiring calcium ion for their precipitation. The small quantity of calcium ion added as a secondary treatment at, for example, compartment or tank D will react only with the phosphate ions coming from the free phosphoric acid that was used in the process solution, as at tank or zone A, and which is usually a minor constitutent employed to maintain the pH of the phosphatizing solution within a range of 2.5 to 4.

Using the two-stage or alternate procedure, the low level of calcium ions in the treatment solution does not have to be be of sufficient quantity to appear as an adherent precipitate on the work surfaces or to coat the pH electrodes that may be used for automatic control of the system. The calcium content is within the value usually encountered in hard water of a drinking water system.

Using either procedure, the pH of the chemical treatment solution supplied through line 19 to treating bath or tank B is kept below about 8 and the pH of the total solution supplied to reservoir E is within the range of 6 to 10. Importantly, below a pH of 10, there is no free calcium alkalinity. Substantially full precipitation and settling of the phosphate compounds is assured by providing a pH of 6 to 10 within the solution of reservoir E, provided that the solution as supplied to the bath B has a sufficient alkalinity to raise the pH of the carry-over from bath A, but below about 8.

In accordance with the invention, it has been determined that the calcium ion is an essential as well as the best reactant for removing all of the phosphates from the carry-over of the workpiece. The calcium ion, as an optimum, and particularly where used alone and not with other alkali metals, is provided in the form of a relatively insoluble compound, such as calcium hydroxide or calcium carbonate. It may, however, be provided in the form of a soluble compound, such as calcium chloride or nitrate. However, the insoluble compound represents the optimum. The insoluble calcium compound gives best assurance from the standpoint of returning the solution along line 19 into tank or bath B in a condition such that it is substantially free from dissolved calcium compounds.

It has been pointed out that other alkali metal compounds may be used with the calcium ion to take care of a portion of the phosphate removal, particularly the removal of metal phosphates. For example, sodium hydroxide or sodium carbonate may be used alone or in combination with each other and with a calcium compound to effect the complete removal of the phosphates and, in this sense, as partial substitutes for calcium required. As above pointed out, however, the calcium ions alone are sufficient, without supplementing the solution by other alkali metal ions. It will also be noted that sodium hydroxide and carbonate are soluble in water and, in this connection, may also be less efficacious.

Although the inventive procedure has been described for the purpose of illustration, particularly from the standpoint of phosphate containing carry-over or waste, and from the standpoint of the use of neutralizing calcium compounds, it will be apparent to those skilled in the art that it may be applied, where appropriate, if the waste or carry-over contains other chemicals and where compatible chemicals are used with calcium in the treatment solution.

I claim:

1. In an integrated in-line method for removing metal phosphates comprising iron and zinc phosphates and phosphoric acid waste drag-out from the metal workpieces that have been subjected in line to a phosphatizing bath, preparing and maintaining a treating bath having an aqueous treatment solution, moving workpieces in-line from the phosphatizing bath into and through the aqueous treatment solution of the treating bath, applying the solution of the treating bath directly to surfaces of the workpieces and washing-off metal phosphates and phosphoric acid therefrom while continuously moving the workpieces from the phosphatizing bath into and through the treating bath and thereafter into and through a water rinse, substantially fully removing the waste carry-over from surfaces of the workpieces into the treatment solution, continuously removing the aqueous treatment solution from the treating bath containing waste carry-over having a pH of about 2.5 to 4 and passing it into and through a conditioning reservoir, reconditioning the aqueous treatment solution within the conditioning reservoir by introducing calcium ions into the solution after its removal from the treating bath and before its removal from the reservoir, neutralizing the phosphoric acid content and precipitating the metal and acid phosphates out of the solution and settling them within the reservoir by employing a pH of about 6 to 10, and providing the reconditioned aqueous treatment solution with a pH of less than 8 and returning it free of dissolved calcium compounds from the reservoir to the treating bath.

2. In a method as defined in claim 1, wherein the calcium ions which are introduced into the aqueous treatment solution containing the waste carry-over after its removal from the treating bath, are provided in the form of a relatively water insoluble calcium compound.

3. In a method as defined in claim 1, introducing calcium ions to the aqueous treatment solution after its removal from the treating bath and before its introduction into the conditioning reservoir.

4. In a method as defined in claim 1, introducing the calcium ions in the form of a relatively insoluble calcium compound selected from the group consisting of calcium hydroxide and calcium carbonate into the treatment solution after it has left the treating bath and within an additive tank, mixing the treatment solution with the calcium compound within the additive tank, and thereafter introducing the treatment solution into the conditioning reservoir.

5. In a method as defined in claim 1, introducing the calcium ions in the form of a water soluble calcium compound into the treatment solution containing the waste carry-over after the solution has been removed from the treating bath and before the phosphates are precipitated and settled out in the conditioning reservoir.

6. In a method as defined in claim 5, precipitating and settling-out calcium phosphate and metal phosphates comprising iron and zinc phosphates from the treatment solution entering and within the conditioning reservoir.

7. In an integrated in-line method for removing metal phosphates comprising iron and zinc phosphates and phosphoric acid waste drag-out from the metal workpieces that have been subjected in line to a phosphatizing bath, preparing and maintaining a treating bath having an aqueous treatment solution, moving workpieces in-line from the phosphatizing bath into and through the aqueous treatment solution of the treating bath, applying the solution of the treating bath directly to surfaces of the workpieces and washing-off metal phosphates and phosphoric acid therefrom while continuously moving the workpieces from the phosphatizing bath into and through the treating bath and thereafter into and through a water rinse, substantially fully removing the waste carry-over from surfaces of the workpieces into the treatment solution, continuously removing the aqueous treatment solution from the treating bath containing waste carry-over having a pH of about 2.5 to 4 and passing it into and through a conditioning reservoir, reconditioning the aqueous treatment solution within the conditioning reservoir by introducing calcium ions into the solution after its removal from the treating bath and before its removal from the reservoir, neutralizing the phosphoric acid content and precipitating the metal and acid phosphates out of the solution and settling them within the reservoir by employing a pH of about 6 to 10, providing the reconditioned aqueous treatment solution with a pH of less than 8 and returning it free of dissolved calcium compounds from the reservoir to the treating bath, introducing a compound selected from the group consisting of alkali metal hydroxides and alkali metal carbonates, the alkali metal being other than calcium, into the treatment solution after its removal from the treating bath and before its removal from the reservoir, whereby the introduction of the alkali metal compound will cause metal phosphates to precipitate and settle and the calcium ions will cause the phosphoric acid to precipitate and settle-out as calcium phosphate within the conditioning reservoir.

8. In a method as defined in claim 7, providing the calcium compound in a slight excess of that required to react with the phosphoric acid in the treating solution before its introduction into the treating bath.

9. In a method as defined in claim 7, wherein the different compound is selected from the group consisting of sodium hydroxide and sodium carbonate.

References Cited

UNITED STATES PATENTS

| | | | |
|---|---|---|---|
| 2,692,229 | 10/1954 | Heise et al. | 210—60X |
| 2,725,314 | 11/1955 | Lancy | 134—13 |
| 2,965,523 | 12/1960 | Engle | 134—27 |
| 3,310,435 | 3/1967 | Robinson et al. | 134—41X |

OTHER REFERENCES

Weiner, Robert: "Effluent Treatment in the Metal-finishing Industry," 1963, pp. 16, 90, 91, 93, 94, 96, 98, 151, 152.

Parsons, W. A.: "Chemical Treatment of Sewage and Industrial Wastes," 1965, pp. 28–32, 82–85.

JOSEPH SCOVRONEK, Primary Examiner

D. G. MILLMAN, Assistant Examiner

U.S. Cl. X.R.

134—28, 41; 210—60